United States Patent [19]
Townsend

[11] 3,858,502
[45] Jan. 7, 1975

[54] SAFETY DEVICE FOR A SKINNING MACHINE

[75] Inventor: Ray T. Townsend, Des Moines, Iowa

[73] Assignee: Townsend Engineering Company, Des Moines, Iowa

[22] Filed: Aug. 21, 1972

[21] Appl. No.: 282,223

[52] U.S. Cl. .............................................. 99/589
[51] Int. Cl. ............................................. A22c 17/12
[58] Field of Search ............ 99/589, 585, 584, 587, 99/588, 590, 591, 592, 593, 595; 68/264, 265; 144/251 R; 83/4

[56] References Cited
UNITED STATES PATENTS
3,747,512   7/1973   Schill .................................. 99/589

FOREIGN PATENTS OR APPLICATIONS
925,450   3/1955   Germany ............................. 99/589

Primary Examiner—Harvey C. Hornsby
Attorney, Agent, or Firm—Zarley, McKee & Thomte

[57] ABSTRACT

A safety device for a skinning machine is disclosed herein. The skinning machine comprises a frame means having a driven roll rotatably mounted thereon and a skinning blade closely positioned thereto. A feed tray is mounted on the frame means and has one end thereof positioned adjacent the driven roll and skinning blade. A movable shield is positioned between the inner end of the feed tray and extends upwardly towards the driven roll and skinning blade. The shield is movable from a first position on the frame means to a safety position on the frame means. The shield permits the product being skinned to move into contact with the skinning blade when the shield is in its first position. The shield shields the driven roll and the skinning blade when the shield is in its safety position to prevent the machine operator from engaging the blade. The shield is mounted on a frame means and has a safety bar connected thereto.

15 Claims, 9 Drawing Figures

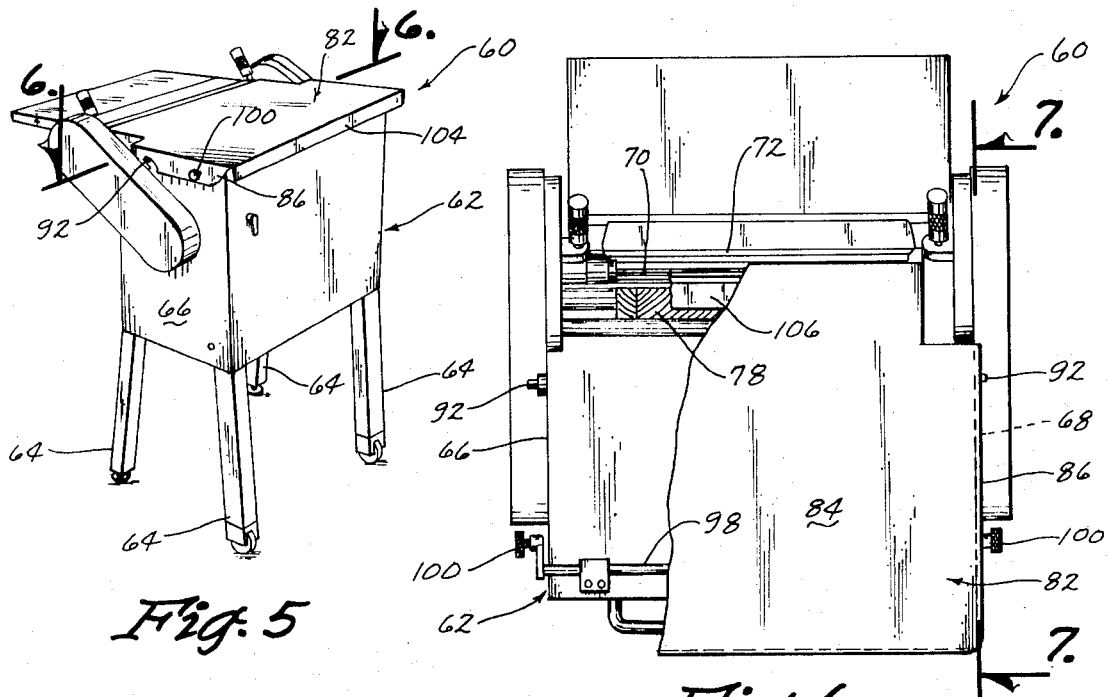
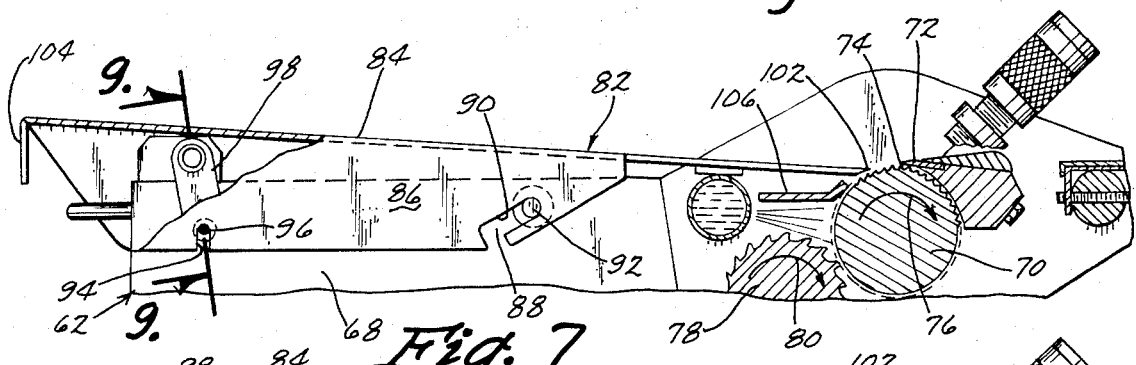
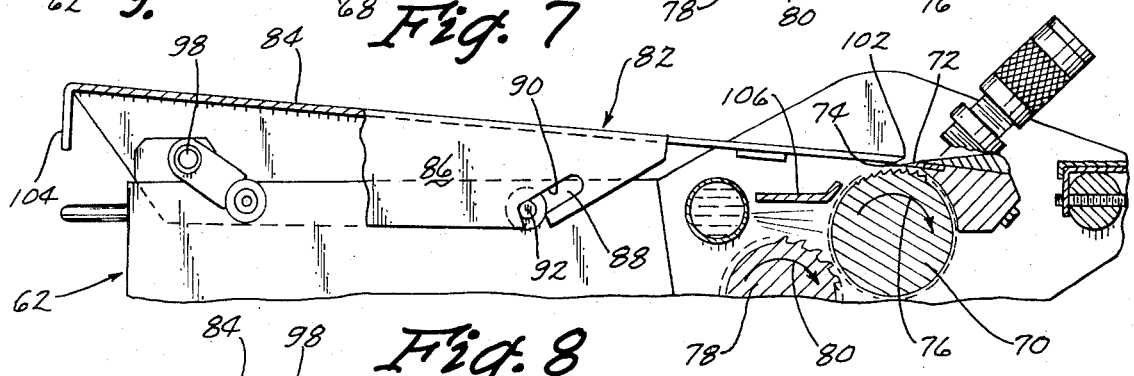
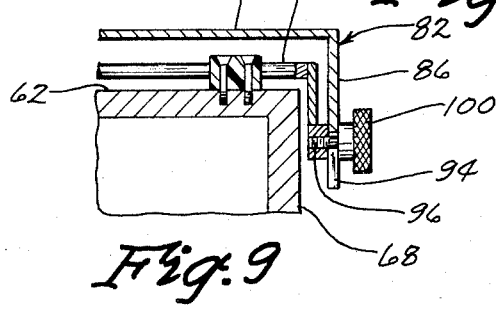

SAFETY DEVICE FOR A SKINNING MACHINE

Skinning machines such as those described in U.S. Pat. No. Re. 23, 222; U.S. Pat. No. 2, 522, 728; and U.S. Pat. No. 2, 912, 027 are employed to remove the skins from meat products such as pork jowls or the like. Generally speaking, the skinning machines include a driven toothed roll rotatably mounted on a frame means adjacent one end of a feed table and a pressure shoe which extends around a portion of the driven roll. The previous machines also generally included a skinning blade which extended from the pressure shoe adapted to sever the skin from the meat product as the meat product is moved thereby. In the skinning operation of the previous machines, the machine operator manually slides the meat product over the feed tray or feed table into engagement with the rotating driven roll and the skinning blade. Accidents frequently occur upon operator's hands slipping and moving into contact with the skinning blade.

Therefore, it is a principal object of this invention to provide a safety device for a skinning machine.

A further object of this invention is to provide a safety device for a skinning machine comprising a shield means, movably mounted thereon which shields the skinning blade when in its safety position.

A further object of this invention is to provide a safety device for a skinning machine which moves into its safety position upon engagement by the machine operator.

A further object of this invention is to provide a safety device for a skinning machine which prevents injury to the machine operator.

A further object of this invention is to provide a safety device for a skinning machine which does not interfere with the normal operation of the machine.

A still further object of this invention is to provide a safety device for a skinning machine which is economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 5 is a perspective view of a skinning machine utilizing a modified form of the present invention;

FIG. 6 is a fragmentary top view taken along line 6—6 of FIG. 5;

FIG. 7 is a sectional view taken along line 7—7 of FIG. 6;

FIG. 8 is a view similar to that of FIG. 7 except that the feed tray has been moved to its safety position; and FIG. 9 is a sectional view taken along line 9—9 of FIG. 7.

Figure 1:
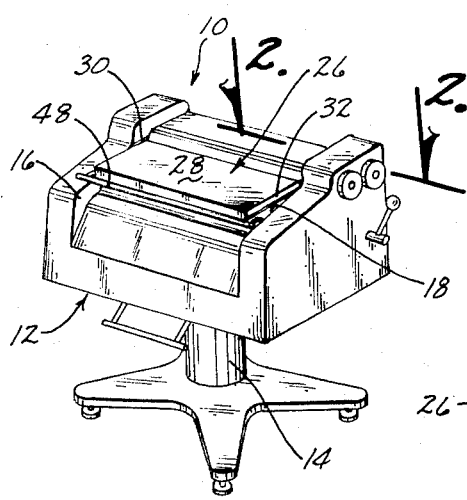
FIG. 1 is a perspective view of a skinning machine.
Figure 2:
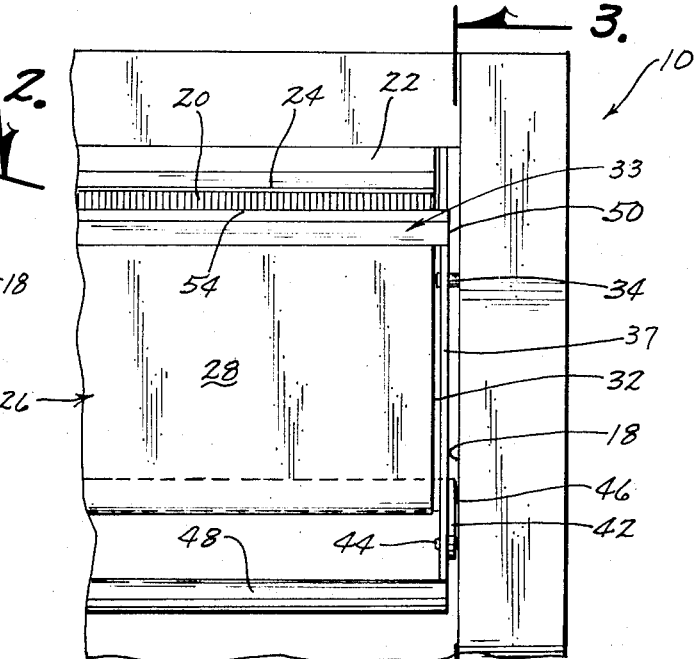
FIG. 2 is a fragmentary top view of the skinning machine having the safety device mounted thereon as seen along lines 2—2 of FIG. 1.

Referring to the drawings, the numeral 10 refers generally to a skinning machine of the general type disclosed in the patents previously identified. Machine 10 generally comprises a frame means 12 supported by a pedestal 14. For purposes of description, frame means 12 will be described as including oppositely disposed side walls 16 and 18.

A driven roll 20 is horizontally rotatably mounted on the frame means 12 and extends between the side walls 16 and 18 as seen in the drawings. The numeral 22 refers to a skinning blade which is closely positioned adjacent the periphery of the driven roll 20 and which has a leading edge 24 adapted to engage the product to be skinned so as to sever the skin or membrane therefrom. Feed tray or table 26 is positioned at one side of the driven roll and skinning blade for moving the product into engagement with the driven roll and skinning blade.

Feed tray 26 has an upper surface 28 adapted to support the product thereon and has opposite sides 30 and 32 positioned inwardly of the side walls 16 and 18 of frame means 12. The numeral 33 refers to the safety device or shield device of this invention. Mounting means for the shield device 33 are provided at each of the sides 30 and 32. Since the mounting means for the shield device 33 at each of the sides of the feed tray 26 are identical, only the mounting means at side 32 has been shown in detail. Pin 34 extends inwardly from wall 18 and is received in a slot 36 formed in frame member 37 which is positioned between side 32 of feed tray 26 and side wall 18. Slot 36 includes angularly disposed slot portions 38 and 40. Arm 42 is pivotally connected at its upper end to one end of the frame member 37 by means of pin 44. The lower end of arm 42 is operatively pivotally connected to a shaft 46 which is secured to the frame means 12. Safety bar 48 is secured to the outer end of the frame member 37 by welding or the like and extends across the front of the machine as illustrated in the drawings. The other end of the safety bar 48 is secured to the frame member at side 30 of the feed tray which corresponds to the frame member 37.

Figure 3:
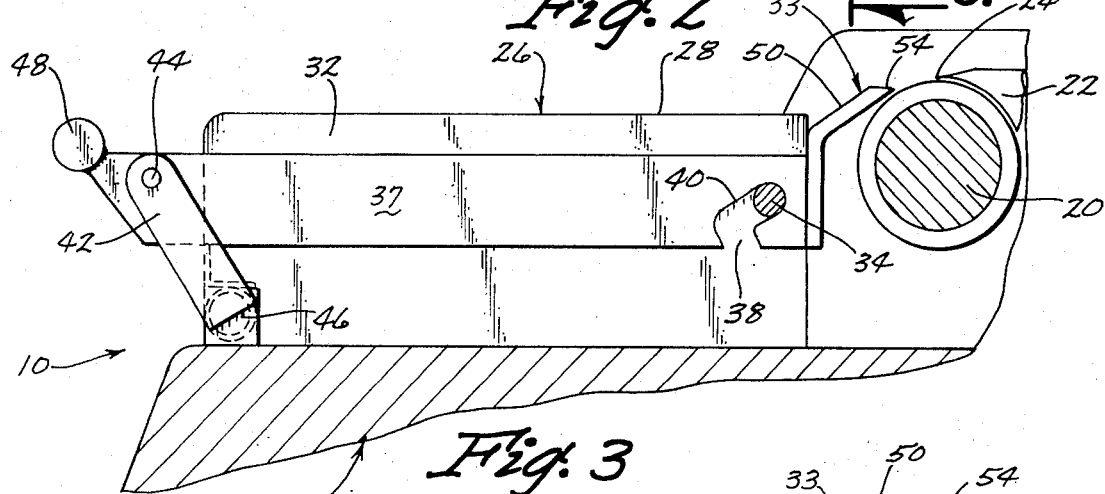
FIG. 3 is an enlarged sectional view seen along lines 3—3 of FIG. 2.
Figure 4:
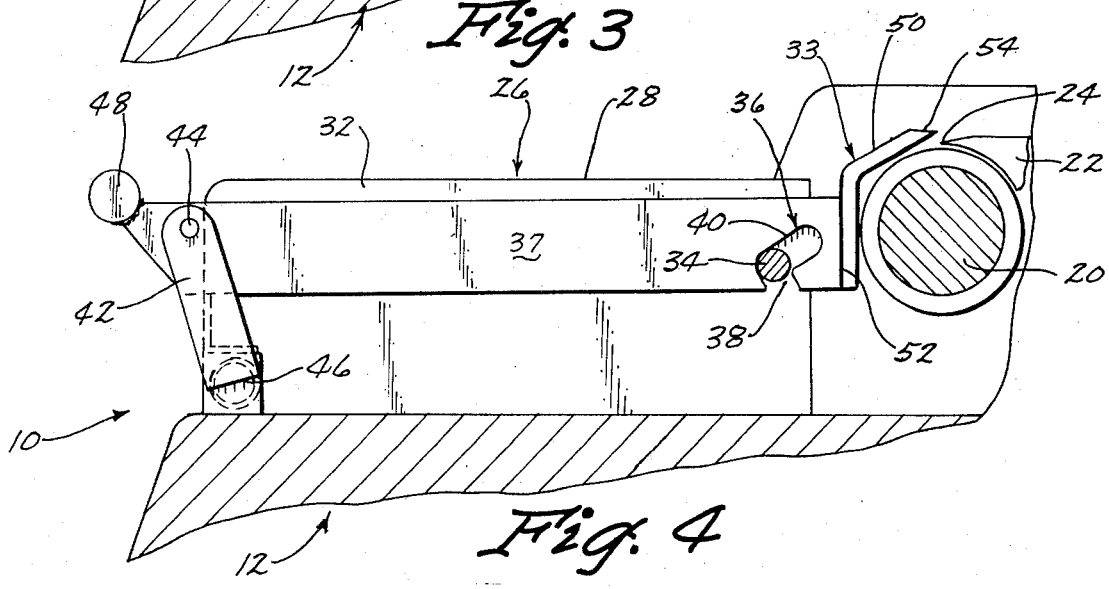
FIG. 4 is a view similar to FIG. 3 except that the shield has been moved to its safety position.

The numeral 50 refers to a shield which is secured to the inner end 52 of frame member 37 and the frame member at the other side of the feed tray and extends therebetween as illustrated in the drawings. As seen in FIGS. 3 and 4, shield 50 extends upwardly from the frame members towards the driven roll 20 and skinning blade 22. The upper end of the shield 50 is beveled at 54 so that the shield will not interfere with the normal skinning operation.

FIG. 3 illustrates the skinning machine in its normal operating position. The product to be skinned would be placed on the surface 28 and moved inwardly towards the driven roll 20 and skinning blade 22. As seen in FIG. 3, the upper end of the shield 50 is positioned in a plane below the upper portion of the the driven roll and is positioned in a plane below the leading edge 24 of the skinning blade 22. Thus, the product would pass over the shield 50 into engagement with the driven roll and skinning blade 22 so that the skin would be removed from the product in conventional fashion. If the operator should slip towards the skinning blade, the engagement of the operator's hand with the shield 50 would tend to move the shield 50 from the position of FIG. 3 to the position of FIG. 4 due to the inward force thereon. Inward movement of the shield 50 from the position of FIG. 3 to the position of FIG. 4 is permitted due to the pivotal arrangement at the outer ends of the frame members and due to the fact that the slot 36 permits the relative movement between the slot and the pin 34. When the shield 50 has been moved to the safety position of FIG. 4, the upper end of the shield 50 is positioned above the leading edge of the skinning blade 22 which prevents the operator from engaging the skinning blade thereby preventing injury to the operator. The safety bar 48 also aids in the shield 50 moving to the safety position since the operator will be likely to engage the bar 48 with his body if he should slip towards the machine.

The mounting means just described not only prevents injury to the operator but also permits the shield to be pivoted away from the driven roll 20 and skinning blade 22 for cleaning operations. It can be seen that the inner end of the frame member 37 can be moved out of engagement with the pin 34 when in the position of FIG. 4 by merely pivotally moving the shield upwardly so that the pin 34 moves out of engagement with the slot portion 38.

Referring to FIGS. 5-9, a second modification of the present invention is shown. The numeral 60 refers generally to a skinning machine of the general type disclosed in patents previously identified. Skinning machine 60 is somewhat different than skinning machine 10 shown in FIG. 1 in that it employs a stripper roll which will be described hereinafter. Machine 60 generally comprises a frame 62 supported by legs 64. For purposes of description, frame 62 will be described as including oppositely disposed side walls 66 and 68.

A gripping roll 70 having serrations thereon is horizontally rotatably mounted on frame 62 and extends between side walls 66, 68, as seen in FIGS. 6-8. A skinning blade 72 is closely positioned adjacent the periphery of gripping roll 70 and includes a leading edge 74 adapted to engage the product to be skinned so as to sever the skin or membrane therefrom. Gripping roll 70 grips the skin by virtue of the serrations on the exterior surface of gripping roll 70 and pulls the gripping roll in a clockwise direction as indicated by arrow 76. A stripping roll 78 is mounted below and slightly to the left of gripping roll 76 and includes a plurality of serrations thereon. Stipping roll 78 is rotatably mounted for rotation about an axis parallel to the rotational axis of gripping roll 76, and rotates in a clockwise direction as indicated by arrow 80. The adjacent peripheral surfaces of rolls 76, 80 pass very closely next to one another and by virtue of the fact that both rolls rotate in a clockwise direction, their adjacent surfaces are moving in opposite directions to one another. This coaction between gripping roll 76 and stripper roll 80 causes the skin which adheres to the surface of gripping roll 76 to be stripped off and removed by the serrations on stripping roll 78.

The safety device of the modification in FIGS. 5-9 differs from the safety device of FIGS. 1-4 in that the entire feed tray comprises the movable safety device. Referring to FIGS. 5-9, a feed tray 82 is movably mounted upon frame 62. Feed tray 82 includes a flat upper surface 84 having downwardly extending lateral sides 86 at its opposite lateral margins. Lateral sides 86 are provided adjacent their forward ends with inclined slots 88 which include an upper inclined camming surface 90. Protruding outwardly from side walls 66, 68 of frame 62 are a pair of pins 92 which extend through and slide within slots 88 of feed tray 82.

Adjacent the forward ends of lateral sides 86, 88 of feed tray 82 are a second pair of slots 94. Extending through slots 94 are threaded ends 96 of a bell crank 98 which extends across the upper surface of frame 62. Bell crank 98 is rotatably mounted on frame 62 for rotation about a horizontal axis. A threaded nut 100 is threadably mounted on the outer end of threaded ends 96 and may be tightened against lateral sides 86, 88 so as to secure sides 86, 88 to bell crank 98.

Flat upper surface 84 of feed tray 82 includes a forward leading edge 102 which is positioned adjacent leading edge 74 of skinning blade 72. Feed tray 82 also includes a rail 104 which is positioned against the forward portion of the skinning machine so that it will be adjacent the operator when the operator is feeding meat into the machine. The normal position of feed tray 82 is shown in FIG. 7. The weight of feed tray 82 causes bell crank 98 to be suspended in a substantially vertical position, and the position of pin 92 within slot 88 is normally at the extreme inner end of slot 88. In this position the leading edge 102 of feed tray 82 is spaced from, and slightly lower than leading edge 74 of skinning blade 72. Leading edge 102 is sufficiently spaced from blade 72 so as to expose a slight portion of the peripheral surface of gripping roll 76. Thus the meat being skinned will be engaged by the serrations on gripping roll 76 and drawn towards skinning blade 72 whenever feed tray 82 is in its normal position shown in FIG. 7.

If the operator for some reason should fall or move toward the skinning blade accidentally the operator will in most cases engage rail 104 of feed tray 82 and exert a pressure thereon in the direction of gripping roll 76 and skinning blade 72. This pressure will cause bell crank 98 to swing forwardly in a counterclockwise direction to the position shown in FIG. 8. The swinging movement of bell crank 98 causes feed tray 82 to move to the right, as viewed in FIG. 8, and also to move upwardly, as viewed in FIG. 8. Furthermore, pin 92 cams against camming surface 90 so as to urge the feed tray 82 upwardly. In its safety position shown in FIG. 8, feed tray 82 is raised and moved forwardly so that leading edge 102 thereof shields skinning blade 72. Thus if the operator slips or moves forwardly, he will engage rail 104 and force feed tray 82 to the position shown in FIG. 8. In such a situation if the operator's hands move towards skinning blade 72 they will be protected from being caught by gripping roll 76 by virtue of feed tray 82.

Feed tray 82 may be removed in order to permit servicing of rollers 70, 78 and skinning blade 72. Removal is accomplished by loosening threaded nuts 100 so that feed tray 100 may be lifted upwardly out of engagement with threaded ends 96 of bell crank 98. Pin 92 may be removed from slot 88 and feed tray 82 is then disengaged from the remainder of skinning machine 60. A protective bar 106 extends between side walls 66, 68 of frame 62 and lies in covering relation over the juncture between the adjacent surfaces of rollers 76, 78. Thus, even with feed tray 82 removed, protective bar 106 protects against the operator's fingers accidentally being caught between rollers 68, 70.

It can be seen from the foregoing that a novel safety means has been provided for a skinning machine which prevents injury to the machine operator and which does not interfere with the normal operation of the skinning machine. Thus it can be seen that the invention accomplishes at least all of its stated objectives.

I claim:

1. A skinning machine comprising:

a frame means having forward and rearward ends;
a skinning blade on said frame means having a horizontally disposed rearwardly presented cutting edge;
a gripping roll adjacent said skinning blade for gripping said product and pulling said product toward said skinning blade;
a feed tray means on said frame means for supporting the product to be skinned while said product is being fed into said skinning blade;
said feed tray means having an inner end positioned adjacent and spaced rearwardly from said cutting edge of said skinning blade,
a shield means between the inner end of said feed tray means and said skinning blade;
means movably mounting said shield means to said frame for movement from a first position wherein said shield is below and rearwardly of said cutting edge upwardly and forwardly to a safety position wherein a portion of said shield is above and in covering relation to said cutting edge.

2. A machine according to claim 1 wherein said mounting means for said shield means comprises at least one link pivotally connected to said frame means and said shield means for pivotal movement about spaced apart horizontal axes so as to facilitate upward and forward movement of said shield means during movement from said first to said safety positions.

3. A skinning machine according to claim 2 wherein said mounting means additionally comprises a cam member and a cam follower for guiding said shield member upwardly and forwardly, one of said cam member and said cam follower being on said frame means and the other being on said shield means.

4. A skinning machine according to claim 1 wherein said shield is positioned above and in covering relation to both said gripping roll and said cutting edge of said blade means when said shield is in said safety position.

5. The machine of claim 1 wherein said frame means has oppositely disposed wall members, said shield means having spaced apart frame members movably secured to said wall members, and a shield extending between said frame members.

6. The machine of claim 5 wherein said shield is positioned at the inner end of said feed tray means and extends upwardly therefrom towards said skinning blade.

7. The machine of claim 5 wherein a bar means is secured to said frame members and extends therebetween, said bar means being positioned outwardly of the outer end of said feed tray means, said bar means being spaced outwardly of said outer end so that movement of said bar means by the machine operator towards said skinning blade will cause said shield to shield said skinning blade.

8. A skinning machine comprising:
a frame means having forward and rearward ends;
a skinning blade on said frame means having a horizontally disposed rearwardly presented cutting edge;
a gripping roll adjacent said skinning blade for gripping said product and pulling said product toward said skinning blade;
a feed tray on said frame for supporting the product to be skinned as said product is fed to said skinning blade, said feed tray having inner and outer ends, said inner end being positioned adjacent and rearwardly of said skinning blade;
means movably mounting said feed tray on said frame for movement from a first position wherein said inner end is spaced from said skinning blade and exposes said skinning blade to said product being fed toward said skinning blade upwardly and forwardly to a safety position wherein said inner end of said feed tray shields said blade to prevent the machine operator from engaging said blade.

9. A machine according to claim 8 wherein said mounting means for said feed tray comprises at least one link pivotally connected to said frame means and said shield means for pivotal movement about spaced apart horizontal axes so as to facilitate upward and forward movement of said feed tray during movement from said first to said safety positions.

10. A skinning machine according to claim 9 wherein said mounting means additionally comprises a cam member and a cam follower for guiding said feed tray upwardly and forwardly, one of said cam member and said cam follower being on said frame means and the other being on said feed tray.

11. A skinning machine according to claim 8 wherein said feed tray is normally in said first position and is movable to said safety position in response to pressure being exerted thereon in a direction toward said skinning blade.

12. A skinning machine according to claim 11 wherein guide means on said frame engage said feed tray and cause said feed tray to move upwardly and toward said blade when said feed tray moves to said safety position.

13. A skinning machine according to claim 12 wherein said guide means comprises a pin on said frame, said feed tray having an inclined camming surface engaging said pin.

14. A skinning machine comprising,
a frame means,
a skinning blade on said frame means,
a feed tray means on said frame means for feeding the product to be skinned to said skinning blade, said feed tray means having inner and outer ends,
said feed tray means having its inner end positioned adjacent said skinning blade, a shield means between the inner end of said feed tray means and said skinning blade, said shield means being movable from a first position on said frame means to a safety position on said frame means,
said shield means permitting the product to be skinned to move into contact with said blade when in its first position, said shield means shielding said blade when in its safety position to prevent the machine operator from engaging said blade,
said shield means comprising a shield positioned between the inner end of feed tray means and said skinning blade, first and second spaced apart frame members secured to said shield and extending therefrom on opposite sides of said feed tray means, said frame members having inner and outer ends, means pivotally connecting said frame members to said frame means adjacent their outer ends, each of said frame members having an inclined slot formed therein intermediate its ends, and a pin means extending from said frame means into said slots to permit said shield to be raised upwardly towards said skinning blade upon said frame members moving inwardly with respect to said feed tray means.

15. A skinning machine comprising:
a frame,
a skinning blade on said frame,
a feed tray on said frame for supporting the product to be skinned as said product is fed to said skinning blade, said feed tray having inner and outer ends, said inner end being positioned adjacent said skinning blade,
said feed tray being movably mounted on said frame for movement from a first position wherein said inner end is spaced from said skinning blade and exposes said skinning blade to said product being fed toward said skinning blade to a safety position wherein said inner end of said feed tray shields said blade to prevent the machine operator from engaging said blade,
said feed tray being normally in said first position and is movable to said safety position in response to pressure being exerted thereon in a direction toward said skinning blade,
guide means on said frame engaging said feed tray for causing said feed tray to move upwardly and towards said blade when said feed tray moves to said safety position,
said guide means comprising a pin on said frame, said feed tray having an inclined camming surface engaging said pin,
said inclined camming surface being a slot in said feed tray, said pin extending through said slot.

* * * * *